United States Patent [19]

Balder

[11] 3,898,715
[45] Aug. 12, 1975

[54] FITTING FOR ADJUSTING A SAFETY BELT
[75] Inventor: Arnold Balder, Wasbuttel, Germany
[73] Assignee: Klippan GmbH Hamburg, Hamburg, Germany
[22] Filed: Apr. 17, 1974
[21] Appl. No.: 461,676

[30] Foreign Application Priority Data
Apr. 21, 1973 Germany............................ 2320314

[52] U.S. Cl. ................................................. 24/196
[51] Int. Cl.² ......................................... A44B 11/00
[58] Field of Search ............. 24/196, 194, 197, 171

[56] References Cited
UNITED STATES PATENTS

| | | | |
|---|---|---|---|
| 2,936,500 | 5/1960 | Elsner | 24/196 |
| 2,977,655 | 4/1961 | Peters | 24/196 |
| 3,013,318 | 12/1961 | Davis | 24/196 |
| 3,193,898 | 7/1965 | Hollman | 24/196 |
| 3,237,263 | 3/1966 | Holmberg | 24/196 |
| 3,561,070 | 2/1971 | Harmon | 24/196 |

Primary Examiner—Donald A. Griffin
Attorney, Agent, or Firm—Jonathan Plaut

[57] ABSTRACT

A device for adjusting a belt, especially a safety belt for use in motor vehicles and the like, which device comprises a U-shaped housing which is fitted to the vehicle either directly or by way of a belt and in the lateral limbs of which is provided a clamping roller, longitudinally displaceable in slots in the direction in which the belt is pulled, the belt being laid around this clamping roller.

7 Claims, 7 Drawing Figures

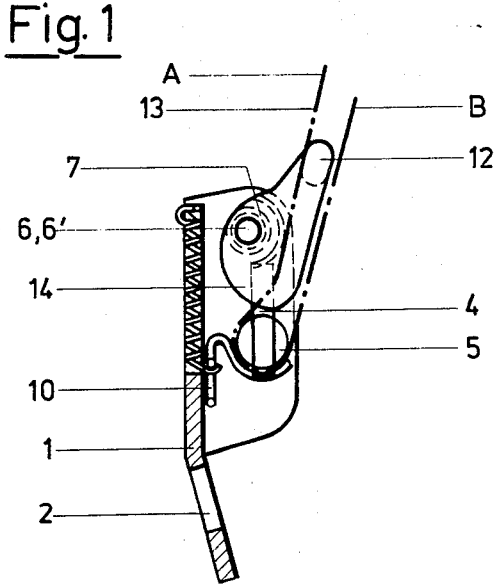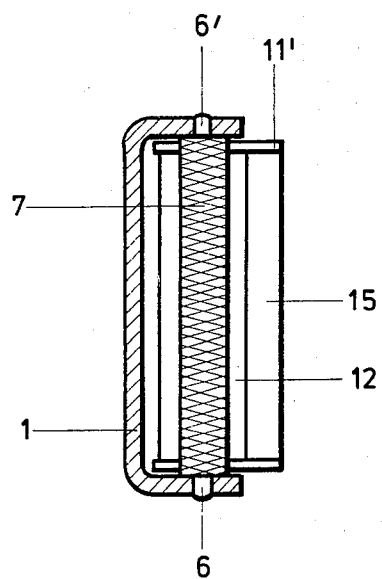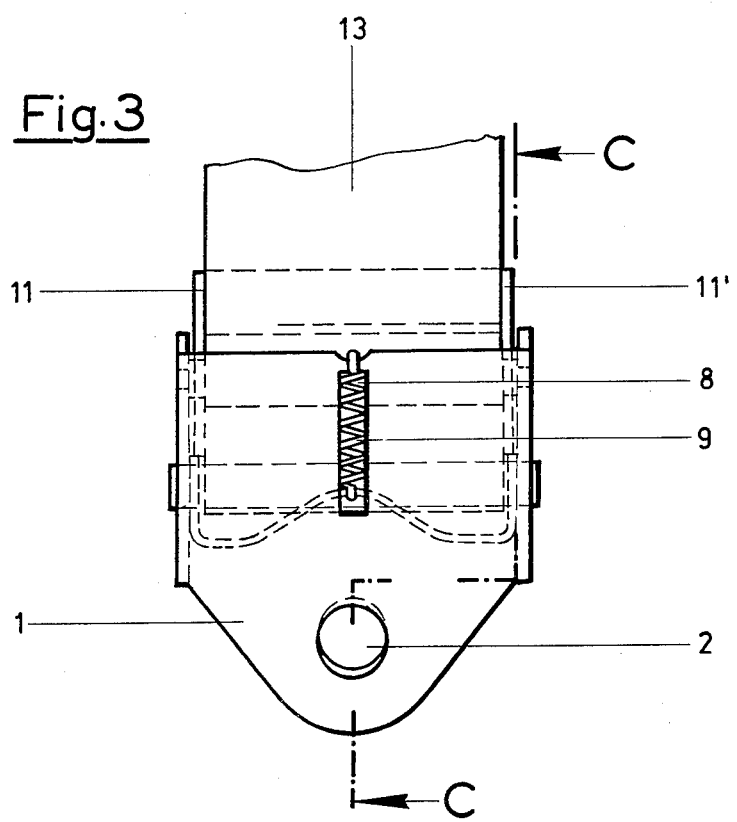

FITTING FOR ADJUSTING A SAFETY BELT

The invention concerns a device for adjusting a belt, especially a safety belt for use in motor vehicles and the like, which device comprises a U-shaped housing which is fitted to the vehicle either directly or by way of a belt and in the lateral limbs of which is provided a clamping roller, longitudinally displaceable in slots in the direction in which the belt is pulled, the belt being laid around this clamping roller.

Safety requirements are becoming increasingly stringent in cars and particularly in aircraft, and it is well known that all motor vehicles will soon have to be equipped with air cushions, safety belts or similar devices in order to protect the occupants of the vehicles in the event of accidents. Car safety belts must be firmly secured and must be adapted to be readily released and fastened. A large number of different types of safety belt, belt buckles and similar accessories have therefore been developed. Safety belts in particular demonstrably offer the best protection to the occupants of cars.

Since the seats of motor vehicles are adjustable and persons of different sizes are intended to use the safety means in one and the same type of motor vehicle, it is necessary for the length of the belt to be adjustable.

German Patent Specification No. 1,557,434 discloses a belt lock which is combined with a device for adjusting the belt to different lengths. The known adjusting device possesses the initially stated features. Whereas the tongue connected to one end of the safety belt is adapted to be inserted in an opening on one side of the known belt lock for the purpose of locking with the belt secured on the lock, adjusting means are provided on the other side of the lock and are accommodated in is housing. The safety belt is laid around a clamping roller displaceably mounted in the belt lock, and the free end of the belt is secured to a gripping member which surrounds the belt. The gripping member is displaceable on the belt. After the lock parts have been closed, the belt is pulled tight around the user to assume the required taut position. The known clamping roller is displaceably disposed in slots extending obliquely to the bottom of the belt lock in such manner that tightening of the belt, for example as a result of the user leaning forward, causes the clamping roller to be displaced outwardly and downwardly, the belt together with the clamping roller moving towards a profiled element on the base and coming into frictional engagement therewith so that further change in the length of the belt cannot occur. This frictional engagement is reinforced by means of a spring-loaded shoe having a support strip. This shoe is likewise adapted to be longitudinally displaced in the direction in which the belt is pulled and in the direction of the spring force or the direction opposite the spring force. In order to adjust the length of the belt, the cover of the belt lock must be pressed back in a direction opposite to that in which the force of the spring is applied so as to release the frictional engagement and to enable the clamping roller and the belt laid around it to be moved out of disengagement with the profiled member in the base of the lock. Apart from its complicated construction, this arrangement does not ensure that unintentional release can be reliably prevented. The user must always use both hands when adjusting the length of the belt, and non-slip locking cannot always be guaranteed.

German Patent Specification No. 1,951,373, as completed, discloses a further means for adjusting belt straps which comprises a plate which has an opening for the belt strap and on which is arranged a clamping device which can be displaced by sliding. This device likewise has an opening through which the belt strap is passed; the device also includes a lug which is bent away from the plate and around which the belt strap is laid, this lug being intended to press against the belt strap. In order to prevent surfaces of the belt from sliding over each other and therefore to avoid unintentional alteration to the length of the belt, a frictional component is inserted between the ends of the belt and in the loop thereof that is laid around the lug. Not only does the known device suffer from the disadvantage that this additional part may be unintentionally displaced or worn or damaged, but the adjustment of the length of the belt here again calls for particular care on the part of the user, the use of both hands and tedious manipulation of the ends of the belt by pushing and pulling them.

There are numerous other known adjusting devices on the market, of which only one, for securing the belt, will be mentioned, this being intended to encourage the use of safety belts in motor vehicles. In this system the lower end of the belt is secured to the floor of the vehicle, while at its upper end there is attached a guide rail which is secured to the bodywork and takes the form of a curved tube in which a ball, attached to the upper face of the belt, is enabled to slide on a compression spring. This arrangement is intended not to get in the way of people entering and leaving the vehicle. The adjustment of the length of the belt without displacing it is achieved in a very primitive manner by drawing one end of the belt through a plate and securing it to a buckle which can be adjusted by being displaced along the belt.

Proceeding from this state of the art, the object of the present invention is to provide a device for adjusting a safety belt of the initially stated kind to different lengths, which device can be operated with one hand and preferably from a distance, simply by pulling on the belt to effect a shortening or lengthening thereof, the device offering considerable safety as regards unrequired displacement, and being of small and inexpensive construction.

According to the invention, this object is achieved in that the slots extend parallel to the base of the housing, at that free end of which that is presented to the belt to be adjusted, there are provided bores, offset from the slots, for rotatably mounting a locking roller which is connected to and rotates with a rocking lever, the arms of which each have a control cam face, cooperating with the clamping roller. The U-shaped housing has in its base either a bore for receiving a screw for securing the adjustment fitting to the bodywork of the vehicle, or a slot for effecting attachment to the belt strap which in turn is secured to the bodywork. The device in accordance with the invention can be used as an adjustment fitting in the textile part of the belt, and in combination as an attachment fitting. Two belt components, necessary for effecting adjustment and for locking are advantageously combined in an inexpensive arrangement to form one part. Manipulation is extremely simple and is superior to that of the known adjustment fittings. If the adjusting device of the invention is disposed within the reach of the occupants of the vehicle, the blocking and adjustment positions can be achieved by operating the device with one hand only. This requirement is not however essential, since the rocking lever can simply be adjusted by pulling on the free end of the belt strap to bring the lever into the open position, and by pulling the other end of the belt strap to bring it into the locking position. The said other end of the belt is that part which is placed around the shoulder or waist of the passenger. Because of the offset arrangement of the locking roller and the rocking lever connected thereto, the locking position is always reached upon pulling the other end of the belt placed around the user, and at the same time the belt is tightened in the locking position.

In an advantageous form of the fitting of the invention, the bores for the locking roller are offset towards the base of the housing at a distance from the slots. In this arrangement the free end at the base of the housing also acts as a stop for the rocking lever in the locked position. Irrespective of the direction in which the belt part, placed round the user, is drawn off the clamping roller, the rocking lever is always swung into the locking position when the belt is pulled. Advantageously, a contribution to this movement is made by the control cam face which, when the free end of the belt strap is pulled and the rocking lever swings into the open position, permits the clamping roller to be pressed away along the slots in the direction opposite to that in which the spring force is exerted. In this way the locking roller and the clamping roller are moved away from each other so that the belt looped round the two rollers moves out of clamping engagement.

In accordance with the invention the clamping and locking action is further advantageously increased by knurling the clamping roller and the locking roller. Then non-slip engagement is ensured upon locking, even if the safety belt has a smooth surface. According to the invention it is also preferred to mount the clamping roller so that it does not rotate and to surround it at least partially by a shaped part on that side opposite the control cam face. This step brings out the simple and surprisingly effective construction of the adjustment device. The clamping roller is thereby always held in contact with the control cam face on the particular arm of the rocking lever, so that a specific distance between the clamping roller and the locking roller is always maintained.

In accordance with a further advantage feature of the invention, a tension spring, disposed in a slot in the base of the housing is attached to the shaped part, the other end of the spring being secured to the base of the housing. This arrangement enables the entire construction to be kept very small without the strength of the adjustment device of the invention being reduced.

Yet another advantageous feature of the invention consists in providing a transverse web between the arms of the rocking lever and on that side of the lever opposite the control cam face. This transverse web likewise contributes considerably to the strength and particularly to the strength of the rocking lever, and also constitutes a strong and readily accessible gripping surface for swinging the rocking lever over. As previously mentioned, this occurs either by applying pressure to the transverse web or by pulling the free end of the belt strap, so that this pressure can be applied, from a distance, to the transverse web and therefore to the rocking lever. In one particular form of construction it has been found expedient for the shaped part to take the form of a bent steel wire. In this way the weight of the adjustment device is reduced, the cost of production is lowered and accessibility from the exterior or space for other components is increased.

Further advantages, features and possible uses of the present invention will be seen from the following description relating to the attached drawings, in which:

FIG. 1 is a cross-section through the adjustment device;

FIG. 2 is a view of the device from the free end, i.e. of the FIG. 1 arrangement as seen from above;

FIG. 3 is a view of the device of FIG. 1 from below, i.e. from the left in the FIG. 1 illustration, the sectional line C—C for FIG. 1 being shown;

Figure 4:
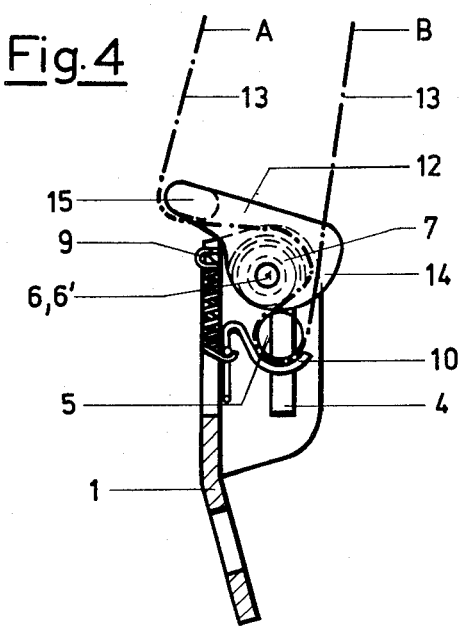
FIG. 4 is a view of the device corresponding to that of FIG. 1, but in the locked position.
Figure 5:
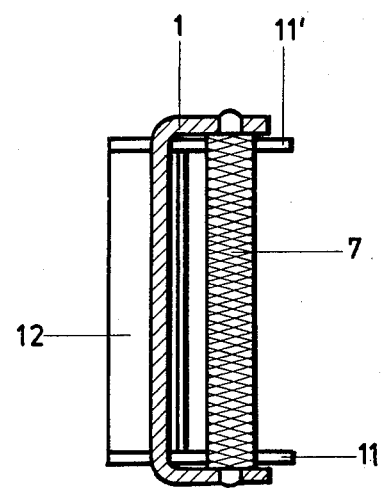
FIG. 5 is a view from above of the device of FIG. 4 in the locked position.

The adjustment device, also referred to as the adjustment fitting, illustrated in the Figures constitutes a particular embodiment of the invention. Herein the form of the u-shaped housing 1 can be seen particularly clearly from FIGS. 1 and 2, and 4 and 5, respectively. Provided in the base of the housing 1 is a bore 2 for receiving a screw, not illustrated, for securing the adjustment fitting to the bodywork of the vehicle, likewise not illustrated. In the form of construction seen in FIG. 7, the base of the housing has a slot 3 through which extends one end of the belt strap which is secured by its other end, not illustrated, to the vehicle.

Slots 4 and 4', extending parallel to the plane of the base of the housing 1, are formed in the lateral limbs of the housing, and the knurled clamping roller 5 runs in these slots, and depending upon the particular forms of construction, lateral pins may, of course, be provided for engagement in the slots 4 and 4'. Offset inwardly towards the base of the housing 1 and at a distance from the slots 4 and 4' are bores 6 and 6' in the lateral limbs, these bores accommodating pins projecting laterally from the locking roller 7, the latter thus being pivotably mounted. At the right and left of the illustrations of FIGS. 3, 6 and 7, the arms 11 and 11' of a rocking lever 12 are firmly secured to the locking roller 7. All the Figures show a transverse web 15 which interconnects the free ends of the arms 11 and 11'. The outer contour of the arms of the rocking lever 12, each incorporating a control cam face 14, can be clearly seen from FIGS. 1 and 4. Each cam face is constituted by a round eccentrically mounted element extending at least partly around the locking roller 7 and having a substantially circular left-hand or lower portion. The right-hand upper portion of the contour of each arm 11 and 11' extends from the ends of the semicircle as a lug-like or rod-like portion which surrounds the transverse web 15.

As shown by the chain-dot line, the belt strap 13 is laid completely around the clamping roller 5 and to varying extents around the locking roller 7 depending on the position of the rocking lever 12. One of the ends of the belt, i.e. its free end, is designated by the letter A and is riveted, in a manner not illustrated, to a plastics part which is adapted to be displaced along the other part of the belt strap that is designated by the letter B. This other part B of the belt is laid over a shoulder or round the waist of the occupant of the vehicle. In another arrangement the free end A of the belt strap 13 may, of course, be secured in a winding reel or in some other device for accommodating the belt. The belt strap 13 is always adjusted in length by paying it out from the free end A when it is required to lengthen it, and by taking it in at that end when it is required to shorten it.

Figure 6:
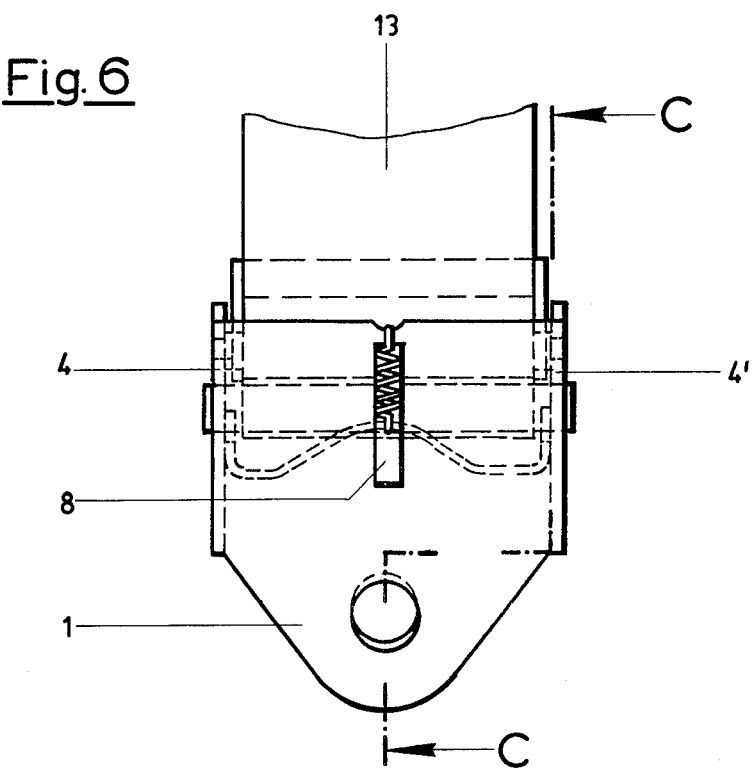
FIG. 6 is a plan view from the left of the device illustrated in FIG. 4, the sectional line C—C for the FIG. 4 view also being shown.
Figure 7:
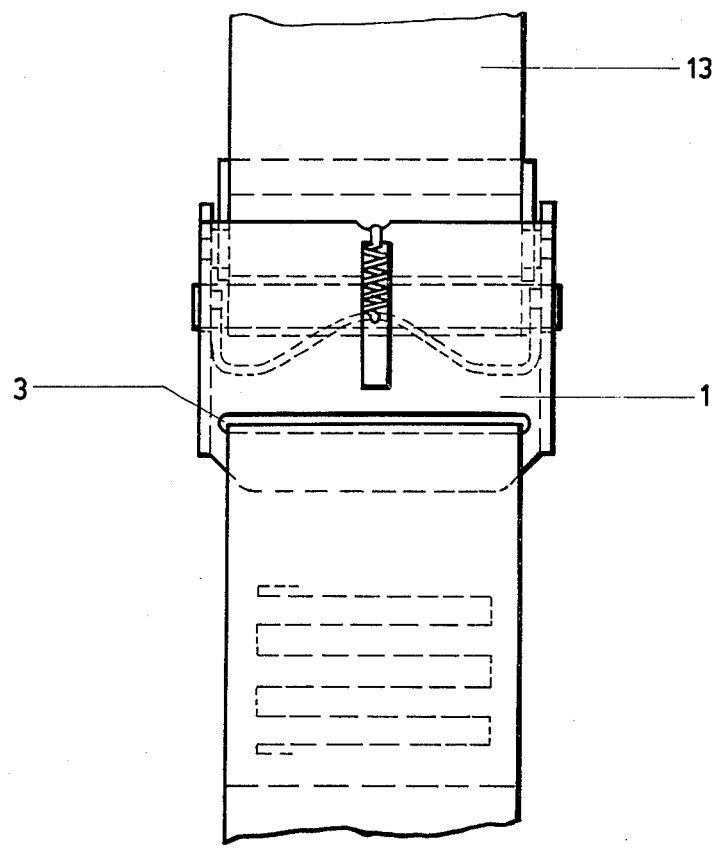
FIG. 7 shows another form of construction of the housing for accommodating the adjustment device or fitting in the fabric part of the belt strap.

Also formed in the base of the housing 1 is a slot 8 in which is fitted a tension spring 9. As shown in FIGS. 3, 6 and 7, one end of this spring is fitted at the top over the free edge of the base of the housing 1, whereas its other end engages in the shaped part 10 which is thus longitudinally displaceable in the housing under spring load between the lateral limbs of the housing. The shaped part 10, in the form of a bent steel wire, surrounds roughly one half of the clamping roller 5 on that side of this roller opposite to the control cam face 14.

The mode of operation of the adjustment device is as follows:

FIG. 1 shows the open postion of the rocking lever 12 in which the control cam face 14, as a result of rotation in the clockwise direction (FIGS. 1 and 4), presses the clamping roller 5, guided by the slots 4 and 4', away from the clamping roller 7 thereby overcoming the force of the spring 9, the clamping roller being held in the position illustrated in FIG. 1. Expediently, the force of the spring 9 is not sufficient to swing the rocking lever 12 from the opened position (FIG. 1) into the locked position (FIG. 4) without any pulling action by the belt strap 13. In the open position shown in FIG. 1, the belt strap 13, by the exertion of pull on the parts A or B, can now be drawn past the stationary clamping roller 5 and the separated and now likewise stationary locking roller 7. If the occupant of the vehicle wishes to lengthen the part B of the belt strap that is laid around his body, he will pull the end B; otherwise he will pull the free end A of the belt strap. Having obtained the required taut position of the belt strap, he has only to pull part B while part A is slack, and the rocking lever 12 is swung to the left into the position of FIG. 4 by the pressure of the clamping roller 5 on the control cam face 14. As this happens the clamping roller 5 will obviously move along the slots 4 and 4' towards the locking roller 7, and the belt strap running between the rollers is firmly clamped. A further pull on part B of the belt simply reinforces the clamping action so that complete safety against unrequired displacement, and an excellent non-slip frictional engagement between the rolls 5 and 7 are achieved. The force of the spring and the pull on part B of the belt thus act in the same direction for moving the fitting into the locking position.

The adjustment device is released by pushing up the transverse web 15 of the rocking lever 12 either directly by hand or from a distance by pulling on the free end A of the belt. The rocking lever 12 then swings in the clockwise direction from the position of FIG. 4 into that shown in FIG. 1.

I claim:

1. A device for adjusting a belt, especially a safety belt for use in motor vehicles and the like, which device comprises a U-shaped housing with a base mounted to the vehicle, said housing provided with a non-rotatable clamping roller, surrounded at least partially by a shaped part, said roller longitudinally displaceable in said housing in slots in the direction in which the belt is pulled, a belt laid around the clamping roller with the slots extending parallel to the base of the housing, bores located in the housing, a locking roller offset from the slots rotatably mounted in the bores and connected to and rotating with a rocking lever, the arms of which each have a control cam face cooperating with the clamping roller.

2. A device according to claim 1, characterized in that the bores for accommodating the locking roller are offset towards the base of the housing at a distance from the slots.

3. A device according to claim 2, characterized in that the clamping roller and the locking roller are knurled.

4. A device for adjusting a belt, especially a safety belt for use in motor vehicles and the like, which device comprises a U-shaped housing with a base mounted to the vehicle, said housing provided with a non-rotatable clamping roller, surrounded at least partially by a shaped part, said roller longitudinally displaceable in said housing in slots in the direction in which the belt is pulled, a belt laid around the clamping roller with the slots extending parallel to the base of the housing, bores located in the housing, a locking roller offset from the slots rotatably mounted in the bores and connected to and rotating with a rocking lever, the arms of which each have a control cam face cooperating with the clamping roller, characterized in that (the clamping roller is non-rotatable and is surrounded at least partially by a) shaped part is on a side opposite the control cam face.

5. A device according to claim 4, characterized in that a tension spring, disposed in a slot in the base of the housing, is attached to the shaped part, the other end of the spring being secured to the base of the housing.

6. A device according to claim 5, characterized in that a transverse web is fitted between the arms of the rocking lever at that side thereof opposite the control cam face.

7. A device according to claim 6, characterized in that the shaped part takes the form of a bent steel wire.

* * * * *

UNITED STATES PATENT AND TRADEMARK OFFICE
CERTIFICATE OF CORRECTION

PATENT NO. : 3,898,715
DATED : August 12, 1975
INVENTOR(S) : Arnold Balder

It is certified that error appears in the above-identified patent and that said Letters Patent are hereby corrected as shown below:

Col. 1, line 35, "is" should read --its--.

Col. 6, lines 42-44: delete "(the clamping roller is non-rotatable and is surrounded at least partially by a)"

Signed and Sealed this eighth Day of June 1976

[SEAL]

Attest:

RUTH C. MASON
Attesting Officer

C. MARSHALL DANN
Commissioner of Patents and Trademarks